United States Patent [19]

Schmidt

[11] Patent Number: 5,669,842

[45] Date of Patent: Sep. 23, 1997

[54] HYBRID POWER TRANSMISSION WITH POWER TAKE-OFF APPARATUS

[75] Inventor: Michael Roland Schmidt, Carmel, Ind.

[73] Assignee: General Motors Corporation, Detroit, Mich.

[21] Appl. No.: 638,664

[22] Filed: Apr. 29, 1996

[51] Int. Cl.$^6$ .................. F16H 3/72; B60K 1/00
[52] U.S. Cl. .................. 475/5; 180/65.2; 180/69.6; 74/15.86
[58] Field of Search .................. 475/3, 5; 180/65.2, 180/65.6, 65.8, 69.6; 74/15.06, 15.84, 15.86

[56] References Cited

U.S. PATENT DOCUMENTS

| | | | |
|---|---|---|---|
| 4,588,040 | 5/1986 | Albright, Jr. et al. | 180/69.6 X |
| 5,492,189 | 2/1996 | Kriegler et al. | 180/65.2 |
| 5,558,588 | 9/1996 | Schmidt | 475/5 |

Primary Examiner—Khoi Q. Ta
Attorney, Agent, or Firm—Donald F. Scherer

[57] ABSTRACT

A power transmission has an internal combustion engine and motor/generators which are combined through a summing planetary gearing. The planetary gearing cooperates with downstream gearing to provide a hybrid power transmission. A plurality of auxiliary or power take-off (PTO) shafts are included to permit the operation of auxiliary devices, such as main hydraulic pumps, air conditioners or power steering pumps. A fluid operated clutch is incorporated between the engine and the gearing so that the motor/generators can drive the PTO shafts independently of the engine. The main pump fluid output can be directed to engage the clutch when the engine input is desired. The motor/generators are controlled to provide output speed resulting in one member of the gearing being driven at a speed equal to the idle speed of the engine, such that the clutch can be synchronously engaged.

3 Claims, 1 Drawing Sheet

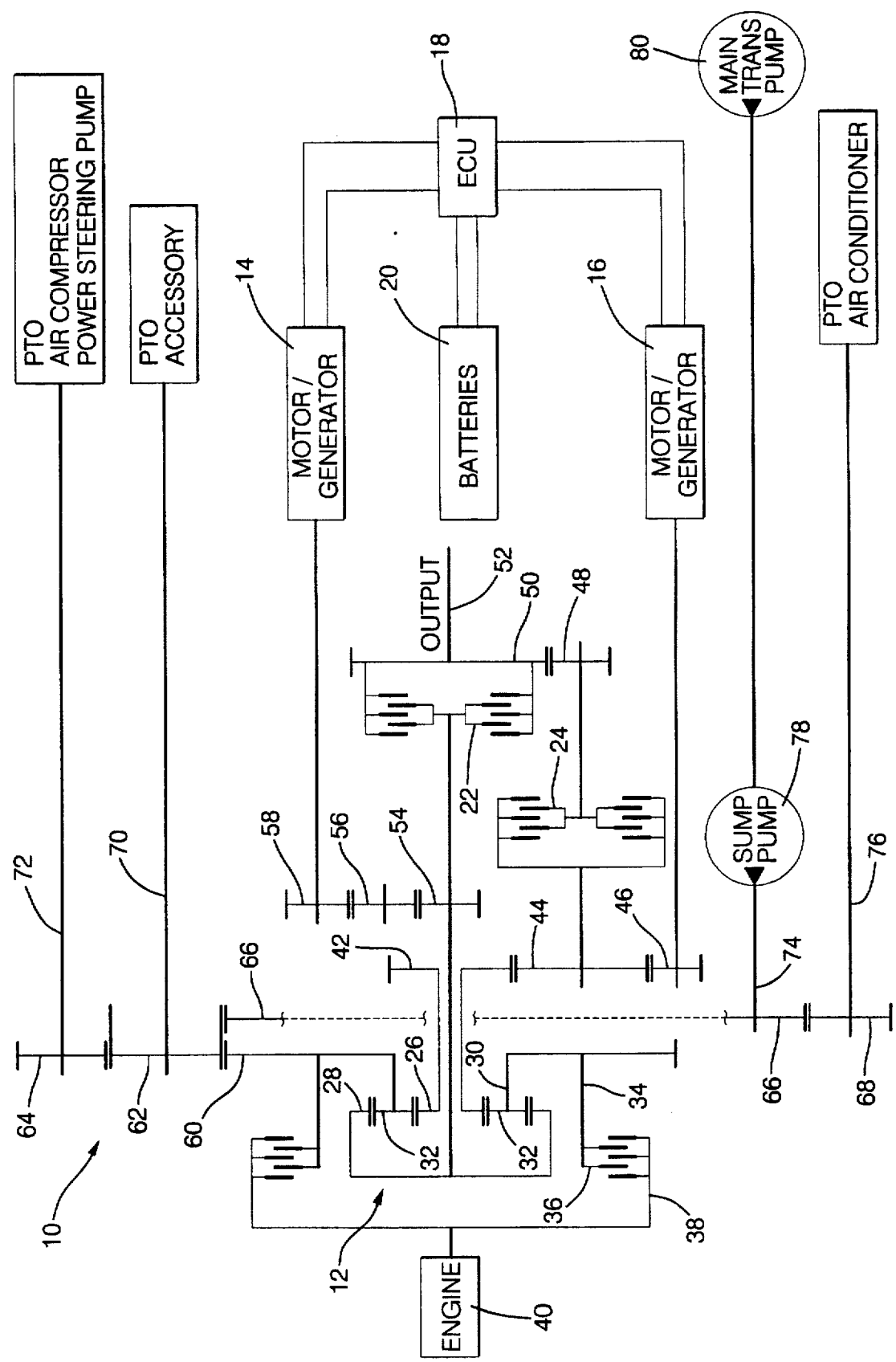

HYBRID POWER TRANSMISSION WITH POWER TAKE-OFF APPARATUS

TECHNICAL FIELD

This invention relates to hybrid power transmissions having power take-off apparatus for supplying power to auxiliary devices.

BACKGROUND OF THE INVENTION

Hybrid power transmissions have at least two power sources, such as an internal combustion engine and an electrical source. The electrical source generally includes storage batteries and motor/generator devices. A power take-off (PTO) is provided to supply power to vehicle accessories.

Generally, the internal combustion engine is the power source for the accessory drive during start-up or initial vehicle operation. The accessories are required by the vehicle or transmission and not by the engine. For example, air conditioning, power steering and power brakes are available to provide satisfactory and comfortable vehicle operation. However, the engine power is not always needed nor desired during vehicle operating conditions; but at least some of the accessories are desired at this time. Generally, this has been accommodated by providing a separate battery and electrical motor drive for the accessories. The battery utilized for driving the engine accessories is charged from the engine power when the engine is operating. Such systems, however, surrender the most efficient accessory drive, that is, the engine drive.

SUMMARY OF THE INVENTION

It is an object of the present invention to provide an improved accessory drive mechanism in combination with an internal combustion engine and an electric hybrid power transmission.

In one aspect of this invention, a hybrid power transmission, such as that disclosed in U.S. Ser. No. 08/389,464, filed Feb. 16, 1995, now U.S. Pat. No. 5,558,588 and assigned to the assignee of the present application, is provided with accessory or power take-off drive shafts. The PTO drive is connected through gearing to the engine portion of the summing planetary of the hybrid transmission. The other members of the summing planetary are connected to respective motor/generators devices.

It is desirable to provide a clutch between the planetary member connectable with the engine and the engine. The clutch is available to disconnect the engine during electric only operation. During this operation, it is often necessary to operate the accessory drives. Therefore, the present invention connects the accessory drive shafts to the summing planetary on the transmission side of the input clutch rather than the engine side. With this aspect of the invention, the PTO can be engine driven, when the engine is operational, and by the electrical drive units when the engine is not operational.

The speed of the motor/generator units, when operating in battery only, can be controlled to propel the vehicle and also drive the accessories. Also during electric only operation, the motor/generator units can be controlled such that the gear member of the summing planetary, which is to be connected with the engine clutch, can be driven at exactly the engine idle speed. The engine can thus be connected with the transmission system through synchronous engagement of the clutch. The elimination of slippage in the clutch during this engagement procedure lengthens the life of the clutch and improves the operating efficiency of the transmission.

DESCRIPTION OF THE DRAWINGS

The drawing is a schematic representation of a hybrid power transmission and accessory drive.

DESCRIPTION OF AN EXEMPLARY EMBODIMENT

The hybrid transmission 10 shown in the drawing is preferably constructed in accordance with the input split hybrid transmissions disclosed in U.S. Ser. No. 08/389,464, filed Feb. 16, 1995, and assigned to the assignee of the present invention. The hybrid transmission 10 includes a summing planetary gearing 12, a first motor/generator 14, a second motor/generator 16, an electrical control unit (ECU) 18, a battery or electrical storage system 20 and a pair of clutches 22 and 24.

The summing planetary 12 includes a sun gear 26, a ring gear 28 and a planet carrier 30. The carrier 30 includes a plurality of pinion gears 32 which mesh with the sun gear 26 and ring gear 28. The carrier 30 has a hub portion 34 which provides a member for a fluid operated friction clutch 36. The input side of the clutch 36 is comprised of a hub 38 which is drivingly connected with an internal combustion engine 40.

Clutch 36 is a conventional fluid operated friction clutch, as are the clutches 22 and 24. As is well known, clutches have a slidably disposed piston which receives hydraulic fluid pressure in a control system, not shown, to cause selective engagement and disengagement of a plurality of interlaced friction plates. The clutch 36 can be engaged to provide a drive connection between the engine 40 and the planet carrier 30, or the clutch 36 can be disengaged to prevent the engine from supplying power whereby engine operation may be discontinued.

The sun gear 26 is drivingly connected with a spur gear or transfer gear 42 which in turn meshes with a transfer gear 44 which in turn meshes with a transfer gear 46. The transfer gear 46 is connected with the motor/generator unit 16 and the transfer gear 44 is connected with the input side of the clutch 24. The output side of clutch 24 is connected with a gear member 48 which in turn meshes with a gear 50 secured to drive continuously with an output shaft 52. The clutch 22 has an output side which is also connected with the gear 50.

The ring gear 28 is drivingly connected with a transfer gear member 54 which in turn meshes with an idler gear 56 which in turn meshes with a transfer gear 58. The transfer gear 58 is drivingly connected with the motor/generator unit 14 and the transfer gear unit 54 is connected with the input side of the clutch 22.

The transmission 10, when combined with the engine 40, provides a two-mode, input split, parallel hybrid transmission. The transmission will deliver power from either the engine in combination with the motor/generators 14 and 16 from the engine alone, or from the motor/generators 14 and 16 alone. The motor/generators 14 and 16 are controlled in speed and torque capabilities by the ECU 18. For a more complete description of the operation of this transmission, the above U.S. Ser. No. 08/389,464 now U.S. Pat. No. 5,558,588 incorporated herein by reference and may be referred to for a more complete understanding.

The carrier 30 also has secured therewith a power take-off gear member 60. The gear member 60 provides power take-off from the hybrid transmission to a power take-off gear 62 which meshes with a power take-off gear 64 and a power take-off gear 66. The power take-off gear 66 in turn meshes with a power take-off gear 68. Thus, the power take-off gear 60 in effect drives four power take-off gears which are connected with respective power take-off shafts 70, 72, 74 and 76.

The power take-off shaft 70 drives a conventional PTO accessory member to which any mechanically driven apparatus, such as an external water pump, can be attached. The power take-off shaft 72 drives an air conditioning compressor and a power steering pump. The power take-off shaft 74 drives a sump pump 78 and a main transmission pump 80. The power take-off shaft 76 drives an air conditioner compressor for a vehicle air conditioning unit. The air compressor driven by the power take-off shaft 72 is operable to supply pressurized air to the vehicle for the operation of systems such as air brakes.

As previously mentioned, when the engine 40 is inoperative and the clutch 36 disengaged, the output shaft 52 can be driven solely by the motor/generators 14 and 16. Also, the motor/generators 14 and 16 can be operated without driving the output shaft 52 simply by disengaging both clutches 24 and 22. When the output of motor/generator 16 is desired to drive the vehicle, the clutch 24 is engaged and the clutch 22 is disengaged. When the motor/generator 14 is desired to drive the vehicle through output shaft 52, the clutch 22 is engaged while the clutch 24 is disengaged.

During the launch maneuver of the vehicle, the motor/generator 16 is connected through clutch 24 to the output shaft 52, while the clutch 22 is disengaged. With the vehicle at rest, the motor/generator 14 is driven at a predetermined speed while the motor/generator 16 is held at zero. With this accomplished, the clutch 24 is engaged with no slip. The motor/generator 16 can then be increased in speed to cause an increase in transmission output speed.

Also, under this condition, that is the motor/generator 16 being held at zero speed and the motor/generator 14 being driven by power from the batteries 20, the carrier 30 of the planetary gear set 12 can be driven at a predetermined speed. This predetermined speed is set to be equal to the idle speed of the engine 40. That is 1300 rpm in the preferred embodiment. With the carrier rotating at 1300 rpm and the engine 40 rotating at 1300 rpm, both sides of clutch 36 are rotating at 1300 rpm.

With the PTO shaft 74 being driven, the main transmission 80 will provide fluid pressure through a control, not shown, to cause engagement of clutch 36. Since both sides of the clutch 36 are operating at the same speed, the clutch is engaged synchronously without slipping or torque transmission being undertaken. After the clutch 36 is engaged, both the speed of engine 40 and the speed of motor/generator 16 can be increased thereby increasing the output speed of the vehicle.

It is important to note that the clutch 36 is engaged synchronously and it is likewise important that all of the accessories can be driven by the motor/generators 14 and 16 without any input from the engine 40. It should also be apparent that the engine 40, when the clutch 36 is engaged, will supply power to the gear 60 and therefore to the power take-off shafts 70, 72, 74 and 76 through their respective members. Thus, during engine operation, all of the accessory drive power can be provided by the engine thereby relieving the motor/generators 14 and 16 of this duty. This provides for the most efficient operation of the accessory units when a vehicle incorporating the hybrid transmission 10 and accessory drive package incorporated therewith is operating at highway speeds where the engine 40 is operated. However, the vehicle does not sacrifice the loss of accessory drive when the engine 40 is inoperable, since, as pointed out above, the accessories can be operated wholly by the motor/generators 14 and 16.

The following chart provides gear tooth and speed values for the synchronous engagement of clutch 36.

|              | Teeth | RPM  |
|--------------|-------|------|
| Engine       | N/A   | 1300 |
| Carrier 30   | N/A   | 1300 |
| Gear 26      | 55    | 0    |
| Gear 28      | 119   | 1900 |
| Gear 42      | 102   | 0    |
| Gear 44      | 106   | 0    |
| Gear 46      | 32    | 0    |
| Gear 54      | 95    | 1900 |
| Gear 58      | 32    | 5643 |
| Gear 60      | 128   | 1300 |
| Gear 62      | 117   | 1422 |
| Gear 64      | 114   | 1460 |
| Gear 66      | 54    | 3181 |
| Gear 68      | 67    | 2484 |
| Motor/Gen. 14 | N/A  | 5643 |
| Motor/Gen. 16 | N/A  | 0    |

Obviously, many modifications and variations of the present invention are possible in light of the above teaching. It is therefore to be understood, that within the scope of the appended claims, the invention may be practiced otherwise than as specifically described.

I claim:

1. An electro-mechanical hybrid drive and accessory drive comprising:

an electrical power and storage source;

a first motor/generator;

a second motor/generator;

control means for selectively connecting said power and storage source with said first and second motor/generators for controlling their respective operation thereof;

an internal combustion engine prime mover having an idle speed;

a planetary gear arrangement having a first member drivingly connected with said first motor/generator, a second member drivingly connected with said second motor/generator, and a third member drivingly connected with a plurality of accessory drive shafts, one of which is drivingly connected with a hydraulic power source;

a hydraulically operated clutch which is selectively engageable to connect said prime mover with said third planetary member; and said first and second motor/generators being operable through said planetary gear arrangement to operate said hydraulic power source and to control the speeds of the first and second members to rotate said third member of said planetary gear arrangement at a speed proportional to said idle speed when said clutch is disengaged to permit selective engagement of said clutch at a speed synchronous with said idle speed.

2. The electro-mechanical hybrid drive and accessory drive defined in claim 1, wherein said first member is a ring gear, said second member is a sun gear and said third member is a planet carrier.

3. The electro-mechanical hybrid drive and accessory drive defined in claim 1, wherein the speed of the second member is zero when the third member is proportional to said idle speed.

* * * * *